United States Patent
Watkinson

(10) Patent No.: US 8,091,385 B2
(45) Date of Patent: Jan. 10, 2012

(54) FORMATION OF GLASS FLAKES

(75) Inventor: Charles Watkinson, Yorkshire (GB)

(73) Assignee: Glassflake Ltd., Leeds (GB)

( * ) Notice: Subject to any disclaimer, the term of this patent is extended or adjusted under 35 U.S.C. 154(b) by 922 days.

(21) Appl. No.: 10/598,398

(22) PCT Filed: Dec. 29, 2004

(86) PCT No.: PCT/GB2004/005457
§ 371 (c)(1),
(2), (4) Date: Dec. 22, 2006

(87) PCT Pub. No.: WO2005/063637
PCT Pub. Date: Jul. 14, 2005

(65) Prior Publication Data
US 2008/0190141 A1    Aug. 14, 2008

(30) Foreign Application Priority Data
Dec. 30, 2003 (GB) .................................. 0330146.2

(51) Int. Cl.
*C03B 37/00* (2006.01)

(52) U.S. Cl. ........................................ 65/21.5; 65/21.1

(58) Field of Classification Search ................ 65/14, 15, 65/66
See application file for complete search history.

(56) References Cited

U.S. PATENT DOCUMENTS
5,017,207 A * 5/1991 Watkinson et al. ............... 65/66

FOREIGN PATENT DOCUMENTS
| | | |
|---|---|---|
| EP | 0289240 A1 | 11/1988 |
| JP | 59-021533 A | 2/1984 |
| JP | 06-056452 A | 3/1994 |
| JP | 06-329429 A | 11/1994 |
| WO | WO88/08412 * | 11/1988 |

* cited by examiner

*Primary Examiner* — Matthew Daniels
*Assistant Examiner* — Jodi C Franklin
(74) *Attorney, Agent, or Firm* — Edwin D. Schindler

(57) ABSTRACT

A method for changing the width of particle thickness size distribution of flakes of material with the flakes being formed by a process that includes the steps of feeding a stream of molten material in a downwards direction into a rotating cup or disc and allowing the material to pass over the edge of the cup or disc in such a manner as to be forced into a gap between a pair of plates surrounding the cup or disc. The movement of material in the process used for forming the flakes is maintained in an angular direction and effected by a flow of air passing through the plates and either side of the material, so as to pull the stream of material in a manner for keeping it flat and, further, to pull the stream of material so that, as solidification of the material is effected, the sheet of material so formed is broken into flakes. The method for adjusting the width of particle thickness size distribution of the flakes of material so formed includes the step of varying the distance between the cup, or the disc, and the entrance to the gap between the plates until the desired particle size distribution is obtained.

5 Claims, 4 Drawing Sheets

FORMATION OF GLASS FLAKES

FIELD OF THE INVENTION

The invention relates to methods for forming flakes or other small particles of glass or of other similar materials, including ceramic materials.

The present invention is applicable to any material which melts when heated and is capable of being formed into small entities such as flakes. Such material is being increasingly used for a variety of purposes including in paints, coatings, cosmetics, carpets, floor tiles and in thermoplastics. The flakes can be used to alter substantially the properties of the materials in which they are incorporated, for instance, by altering their appearance, in particular the light reflective properties, and by improving the materials mechanical properties and also by increasing fire retardancy and smoke emissions.

BACKGROUND TO THE INVENTION

In our European patent specification No 0 289 240 there is disclosed apparatus for forming flakes of material from a heated stream of molten material. The apparatus comprises means for feeding the stream in a downwards direction into a rotating cup, the cup being arranged with its open mouth facing upwardly such that molten material within the cup is caused to flow over the upper edges of the cup and flow outwards in a radial direction due to centrifugal force. The apparatus also includes a pair of spaced apart substantially parallel plates arranged about the cup such that the material leaving the cup by centrifugal force passes through a gap defined between the plates. The plates are mounted within a vacuum chamber arranged such that a vacuum is applied to the space between the plates forming an annular venturi drawing air from outside the chamber between the plates in a radial direction, maintaining angular velocity and preventing the molten material from touching the sides of the plates and cooling the material until reaches a solid state. The material is pulled at velocity by the air stream in an angular direction as the radius expands thereby keeping it in the form of a flat film and ultimately breaking it into small platelets.

It is stated in EP 0 289 240 that by suitable choices of the speed of rotation of the cup, the distance between the two plates and the rate of air flow through the vacuum chamber, the size and thickness of the flakes of material to be produced can be changed and controlled. It is further stated that the apparatus may be used not only with glass but with materials such as basalt, ceramics such as alumina, graphite, and metals such as lead. For each different material it may be necessary to alter the operation of the apparatus by, for instance, varying the speed of rotation of cup, the temperature of the molten material, the size of the gap between the plates and the airflow between the plates. In a further reference to factors which may be varied, reference is made to the volume of molten stream entering the cup, the temperature of that material, the speed of the cup, the diameter of the cup, the distance between the cup and the plates and the airflow at the exit from the vacuum chambers associated with the plates.

As far as concerns the distance between the cup and the plates, there was no clear understanding of the effect of changing this distance. It was known that the distance could only be varied in both directions within certain parameters to produce flake rather than strands or fibres but the main effect was thought to be a reduced thickness of flake with increase in distance between the cup and the plates due to a longer period of stretching the glass before cooling and an increase in nominal flake diameter.

In practice, for some applications glass flakes are required with a particle thickness size distribution as narrow as possible, since this results in a product with the desired range of physical properties for further processing. In other applications a wide spread of particle size distribution may be required, for example to provide optical effects. However, there are, as indicated above, a substantial number of parameters affecting the nature of the product of which the cup plate separation represents only one possible variable. It was thought that the distance between cup and plates should be fixed at a median consistent with the production of acceptable flakes, with the parameters of thickness being changed by varying the plate gap, cup peripheral velocity and air flow. Any change of the cup to plate distance was thought simply to be an additional means of changing the thickness of the product but not of changing the thickness distribution.

Apparatus as described in EP 0 289 240 has been operated for many years on what was thought to be the most optimal combination of operating conditions in order to produce the best product. However, even under such conditions, glass flake is produced with a controlled thickness but quite a wide particle distribution range which was generally thought to be uncontrollable. For many applications, the size range required is outside that produced by such apparatus. Accordingly, the product has to be graded and the material at the bottom and top of the size range has to be removed and then discarded or recycled. This process increases the expense of producing the product and it would be desirable if a product could be produced with a more specific particle size range so that the extent of grading, discarding and recycling of products can be reduced or eliminated.

STATEMENTS OF THE INVENTION

According to the present invention there is provided a method of changing the particle thickness size distribution of flakes of material formed by a process which comprises feeding a stream of molten material in a downwards direction into a rotating cup or disc, and allowing the material to pass over the edge of the cup in such a manner as to be forced into the gap between a pair of plates surrounding the cup, the movement of the material being maintained in an angular direction and effected by a flow of air passing through the plates and either side of the material so as to pull the stream of material in such a manner as to keep it flat and also to pull it so that, as solidification of the material is effected, the sheet of material so formed is broken into flakes, the method comprising varying the distance between the cup and the entrance to the gap between the plates until the desired particle size distribution is obtained.

Accordingly, the present invention provides a means whereby, in the production of glass flakes or other flake material, the relationship between the edge of the spinning cup or disc, instead of remaining fixed is changed, to produce a difference in particle thickness size distribution thus allowing production of discrete size distributions during the production phase rather than as a secondary production process.

Although it was previously known that variation of the distance between the cup and the plates was one of many factors which could affect flake size (as mentioned in EP 0 289 240), it was not appreciated that varying this distance could have a profound effect on the particle thickness size distribution and it is this particular characteristic of a product which is fundamental to the quality of the product. Indeed, it had been assumed that any significant increase of the cup-plate separation, beyond the median at which an acceptable product is obtained, would lead to a deterioration of the product and in particular its flatness and any reduction simply reduced the nominal flake diameter. However, the surprising discovery is that the cup-plate separation can be substantially increased or decreased with a concomitant change in particle size distribution and without any other reduction in the quality of the product provided the nominal thickness difference is compensated for by one of the other parameters. Furthermore, it is also an advantage that when increasing the cup-plate separation there is reduced wear on the plates which is caused by the interaction between the material being processed and the plate.

The cup-plate separation can be varied by up to 1500% from the minimum separation to obtain a suitable product. For instance, if the "normal" separation of the cup and the plates is 200 distance units then increasing the distance up to 500 units may obtain a wide particle size distribution or conversely reducing the distance to 100 units may give a much narrower particle size distribution.

Preferably the particle size distribution to be achieved by varying the distance between the cup and the plates is in the range from 10% to 95%, by which is meant that at 10%, then 95% of all particles are within a 10% size variation and at 95%, substantially all particles are within a 95% size variation.

It will be appreciated that, by adjusting the cup-plate separation, glass flake production can be carried out in such a way that the need to classify or grade and recycle glass flakes outside the desired particle size distribution can be substantially reduced or even eliminated.

The present invention also provides a process for forming flakes, as described above, which includes determining the separation between the cup and the plate at a distance such that the particle thickness size distribution is in the range 700 to 900 nanometres when set at approximately 100 units, and 700 to 1300 nanometres when set at 500 units thus allowing the apparatus to be operated in modes where the thickness particle size distribution can be varied to suit production/end use requirements.

DETAILED DESCRIPTION OF THE INVENTION

A process for producing glass flakes will now be described, by way of example, with reference to the accompanying drawings.

Figure 1:
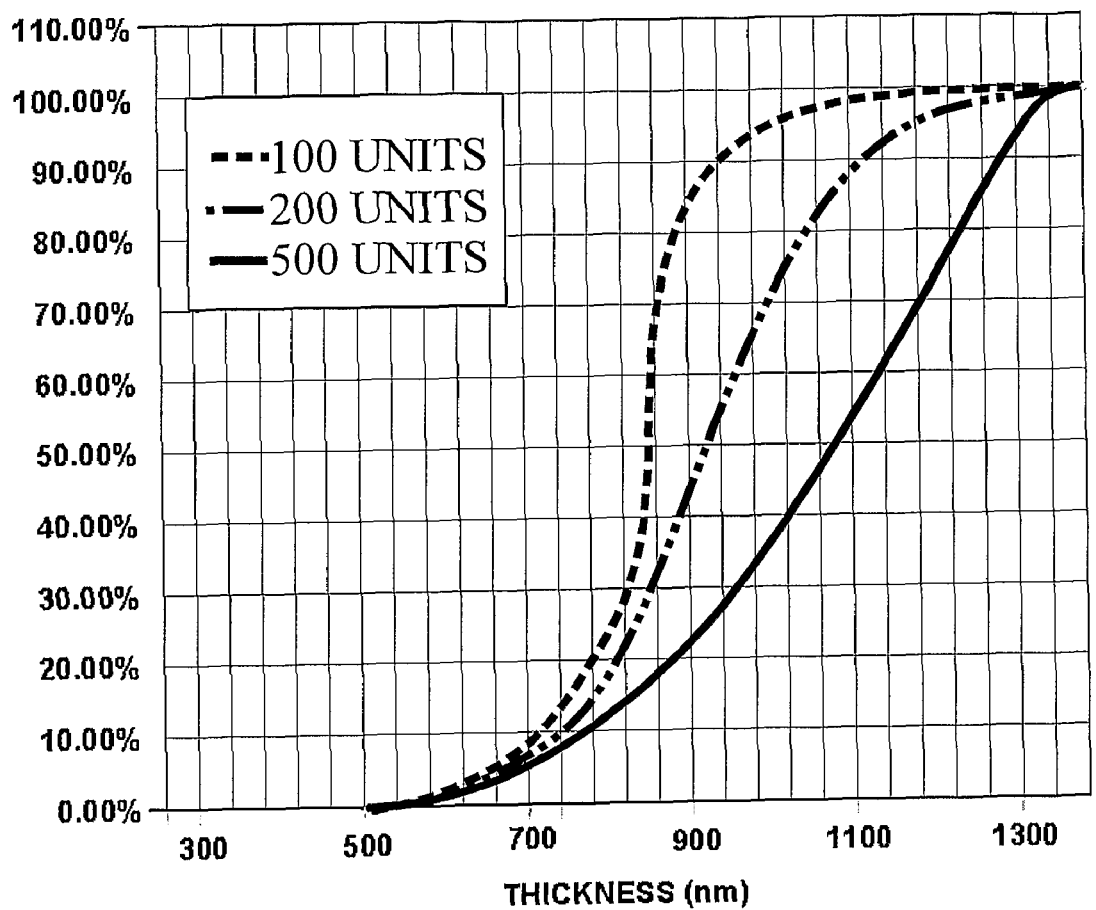
FIG. 1 shows graphically particle size distribution, obtained by varying cup-plate separations.

The process is essentially that described in EP 0 289 240 and makes use of apparatus also described and illustrated in this document. FIG. 1 of the accompanying drawings shows how dramatically the particle size distribution can be changed by varying the separation between the cup 5 and the plates 9 (the item numbers are as used in EP 0 289 240). With the plates set at a distance from the cup which, having regard to all the other features and running conditions of the apparatus, is a minimum in order to achieve a satisfactory product, the size distribution is that indicated by plot C. With such a size distribution, a considerable proportion of the glass flakes have a size more than 10% greater than the average or less than 10% lower than the average.

By decreasing the cup-plate separation from 500 units to 200 units, as illustrated in plot B, substantially more of the particles are within the desired particle size distribution (10% from the average). Reducing the cup plate separation still further (to 100 units, as illustrated in plot A) reduces still further the proportion of particles outside the desired range (10% from the average).

Figure 2:
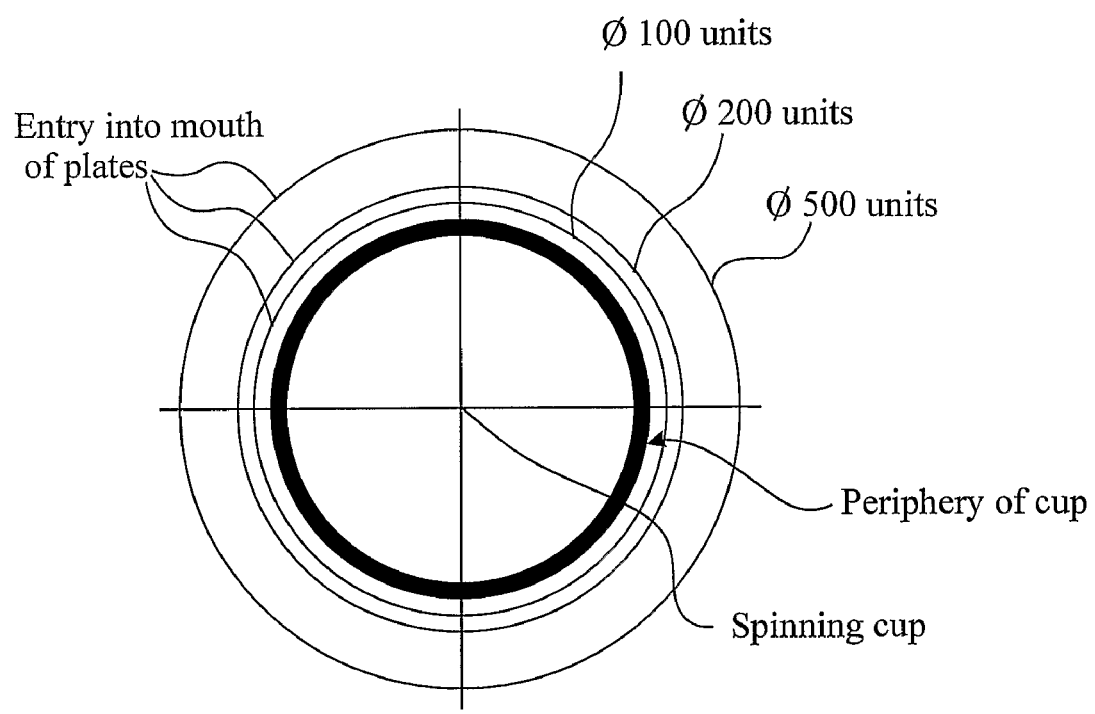
FIG. 2 shows the different relationship between the edge of the spinning cup and plate entry.

FIG. 2 shows, diagrammatically, the distances between the outer periphery of the cup and the mouth of the plates, corresponding to plots A (100 units), B (200 units) and C (500 units) shown in FIG. 1.

Figure 3A:
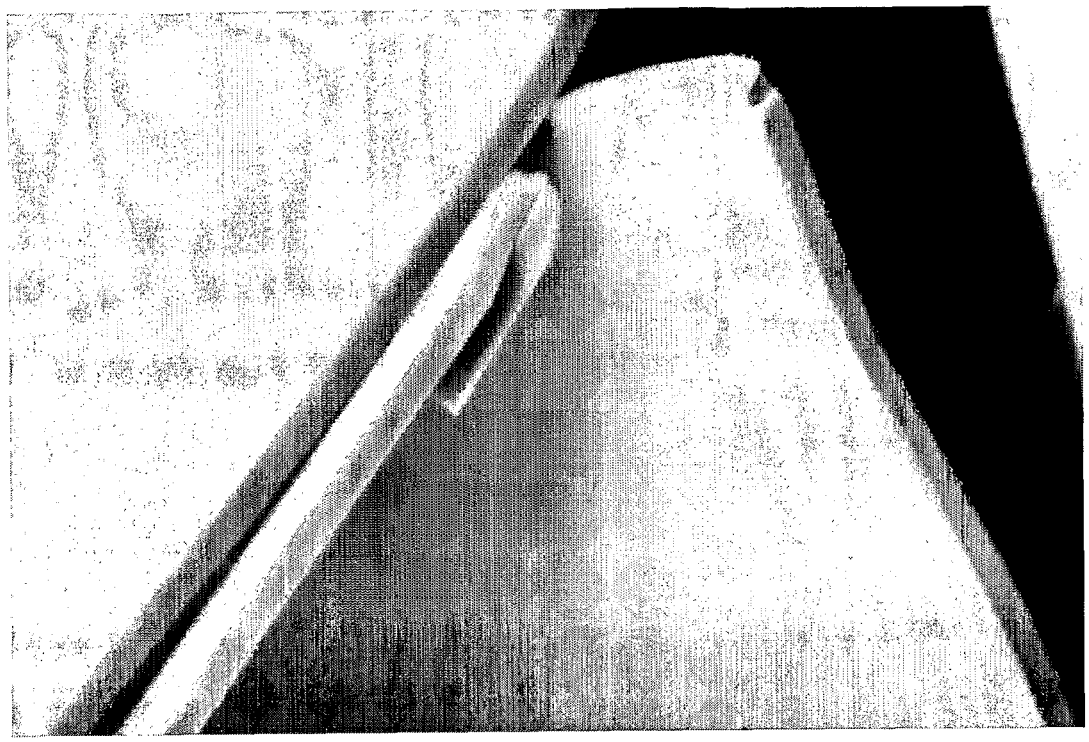
FIGS. 3a and 3b illustrate samples of particles produced as a result of different cup-plate separation.
Figure 3B:
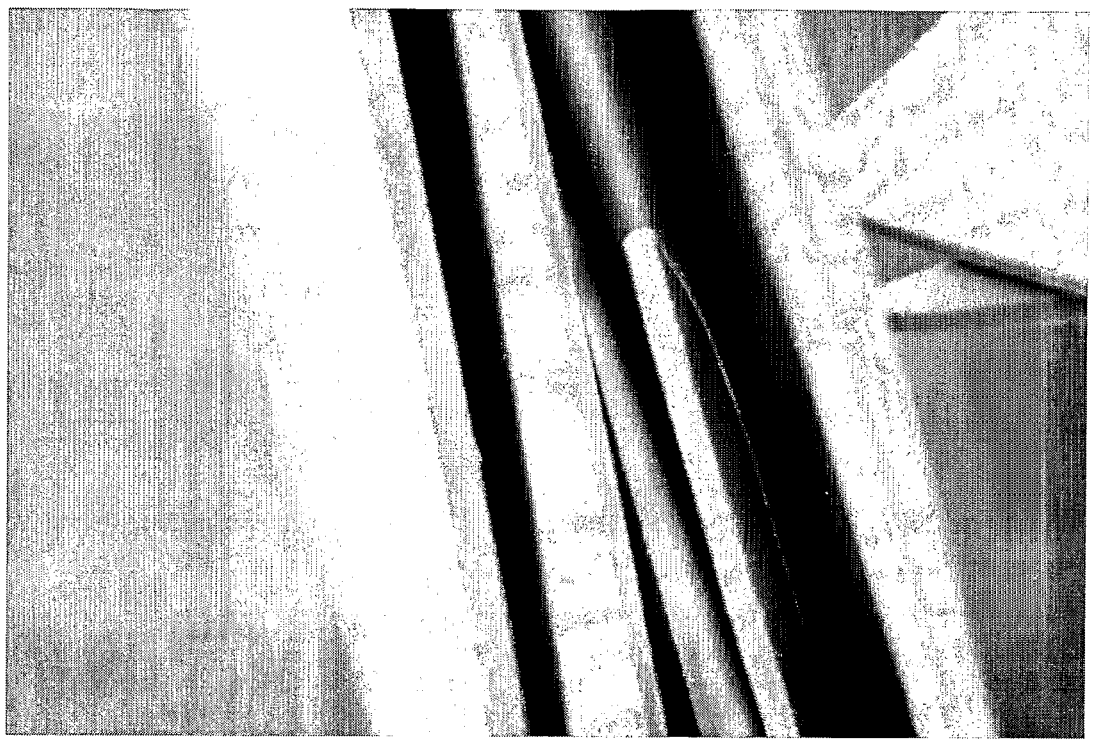

FIGS. 3a and 3b illustrate flakes obtained separations of 100 and 500 units respectively. It can be seen that the thickness of the flakes at 100 units separation is very uniform whereas there is considerable variation at 500 units separation.

The invention claimed is:

1. A method for changing a particle thickness size distribution of flakes of material, said flakes of material being formed by a process comprising the steps of:
feeding a stream of molten material in a downwards direction into a rotating cup or disc;
allowing the stream of molten material to pass over an edge of the cup or the disc for forcing the stream of molten material into a gap between a pair of plates surrounding the cup or the disc; and,
maintaining movement of the stream of molten material in an angular direction via a flow of air passing through the pair of plates and either side of the stream of molten material for pulling the stream of molten material, so that the stream of molten material is, and is kept, in a flattened state and, further, for pulling the stream of molten material so that, as solidification of the stream of molten material occurs, a sheet of solidified material is formed that brakes into said flakes of material,
said method for changing the particle thickness size distribution of said flakes of material so formed, comprising the step of:
varying a distance between the cup, or the disc, and an entrance to the gap between the pair of plates until a desired particle thickness size distribution of said flakes of material is obtained.

2. The method for changing a particle thickness size distribution of flakes of material according to claim 1, wherein said distance between the cup, or the disc, and the entrance to the gap between the pair of plates is variable by up to 1,500% from a minimum separation of the pair of plates.

3. The method for changing a particle thickness size distribution of flakes of material according to claim 1, wherein the particle thickness size distribution achievable by varying said distance between the cup, or the disc, and the pair of plates is in a range of from 10% to 95%.

4. The method for changing a particle thickness size distribution of flakes of material according to claim 1, wherein said distance between the cup, or the disc, and the pair of plates results in the particle thickness size distribution being in a range of 700 to 900 nanometers when said distance is set at approximately 100 units.

5. The method for changing a particle thickness size distribution of flakes of material according to claim 1, wherein said distance between the cup, or the disc, and the pair of plates results in the particle thickness size distribution being in a range of 700 to 1,300 nanometers when said distance is set at approximately 500 units.

* * * * *